March 18, 1930.                C. BETHEL                    1,751,228
                           FLEXIBLE GEAR WHEEL
                           Filed July 27, 1927            3 Sheets-Sheet 1
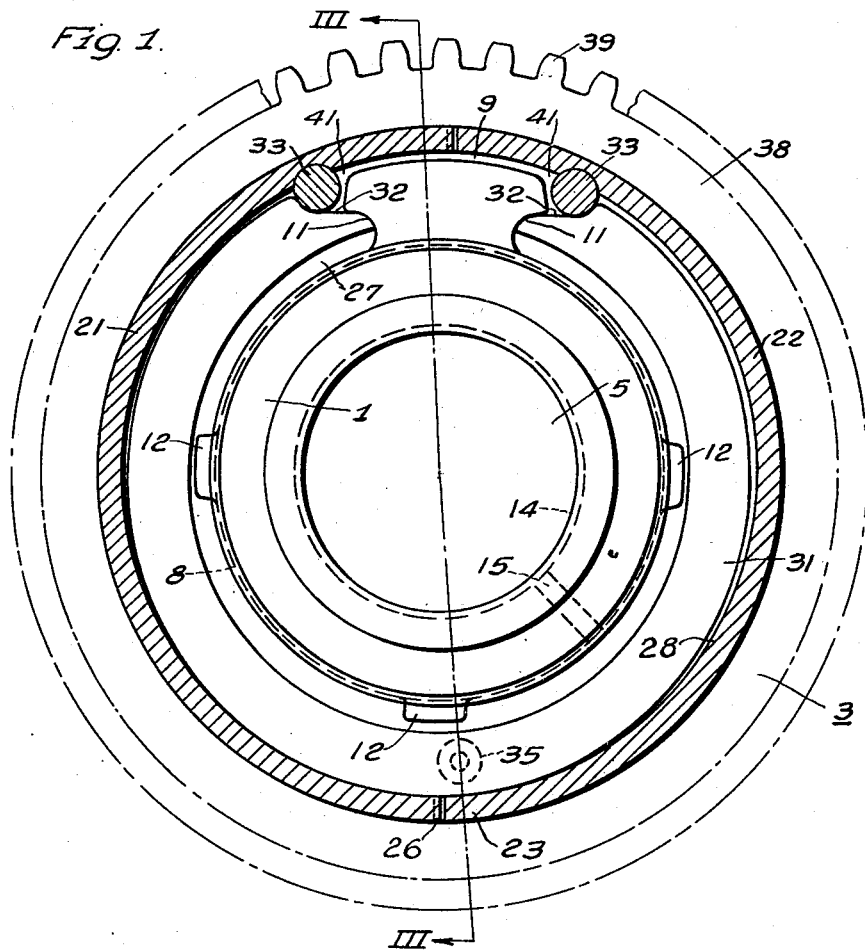
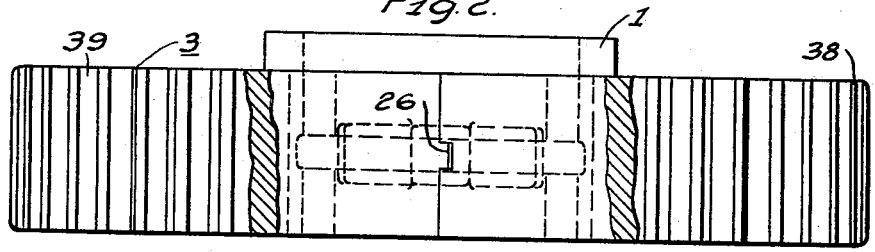
WITNESSES:                                              INVENTOR
                                                      Claude Bethel.
                                                           ATTORNEY March 18, 1930.                    C. BETHEL                    1,751,228
                              FLEXIBLE GEAR WHEEL
                             Filed July 27, 1927           3 Sheets-Sheet 2
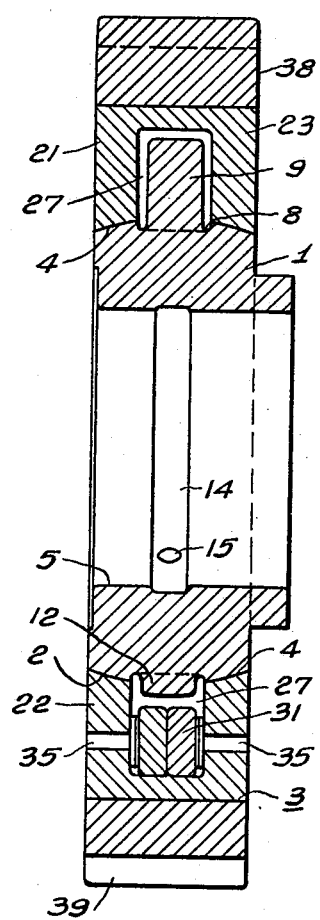
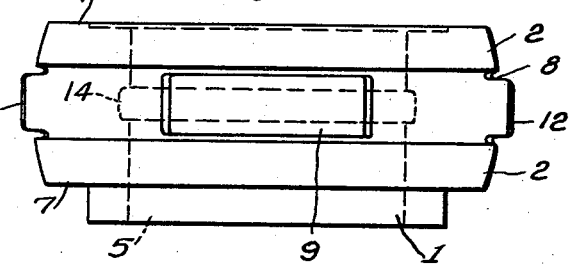
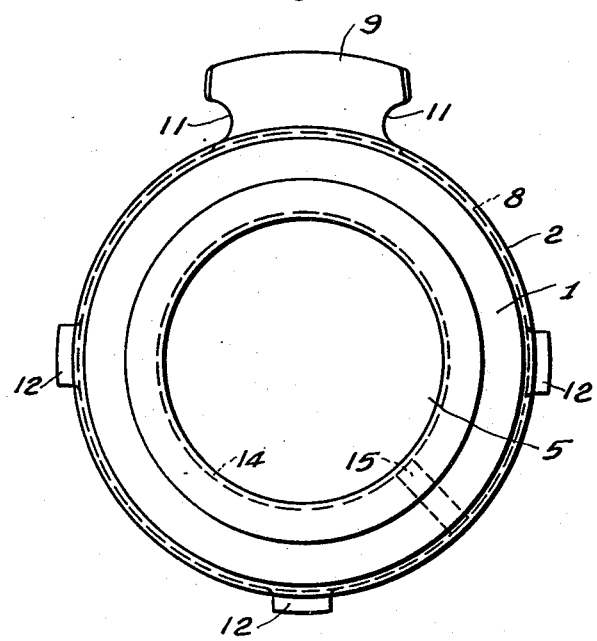
WITNESSES:                                           INVENTOR
E.A. McCloskey.                                   Claude Bethel.
W. D. O'Connor                                       BY
                                                  Wesley L. Carr
                                                     ATTORNEY March 18, 1930.　　　　　C. BETHEL　　　　　1,751,228
FLEXIBLE GEAR WHEEL
Filed July 27, 1927　　　3 Sheets-Sheet 3
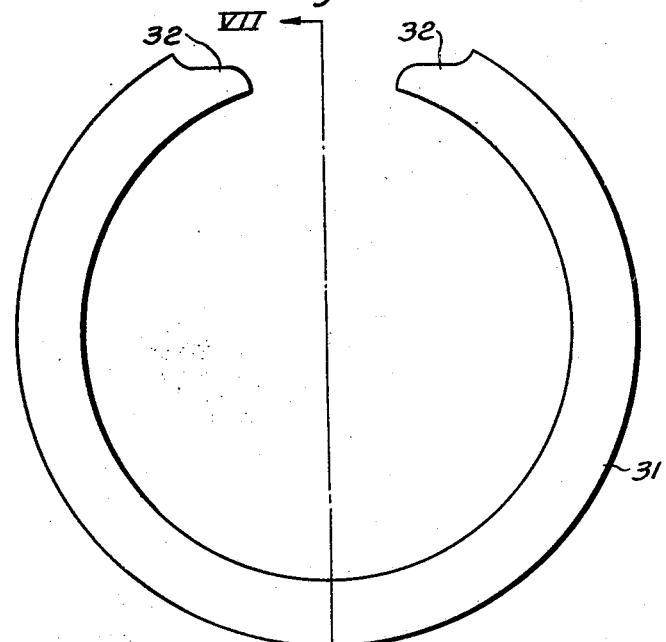
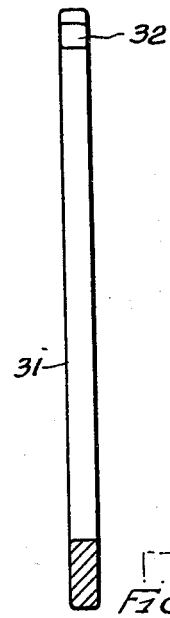
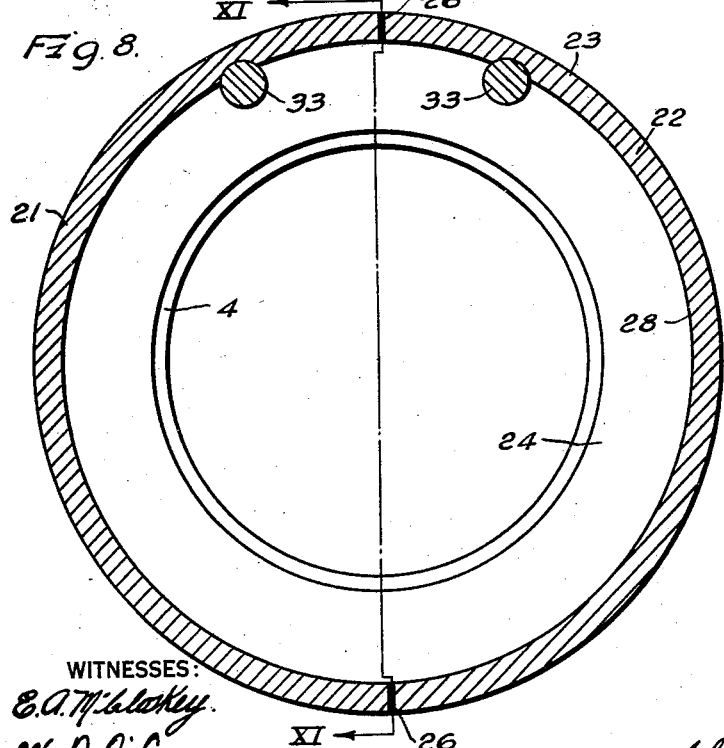
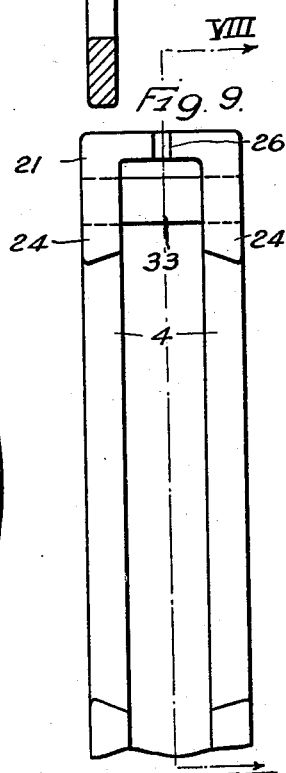
INVENTOR
Claude Bethel.
BY
ATTORNEY Patented Mar. 18, 1930

1,751,228

UNITED STATES PATENT OFFICE

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA

FLEXIBLE GEAR WHEEL

Application filed July 27, 1927. Serial No. 208,712.

My invention relates generally to flexible gear wheels and particularly to gear wheels in which rim members are mounted for limited universal movement on hub members, and that are provided with flexible elements to permit resilient annular displacement of the gear rims relative to the hub structures.

It is among the objects of my invention to provide a flexible gear wheel of compact and durable construction that is adapted to operate under conditions of misalinement and shock, such as are encountered in electrically-driven railway vehicles.

Another object of my invention is to provide a gear wheel having a spherical connection or seat between the hub and rim portions and resilient elements that have a rising load-deflection characteristic for transmitting torque from the hub to the rim portion.

It is also an object of my invention to provide a spherically-seated flexible gear wheel in which the resistance to lateral displacement increases with the torque being transmitted and that is stable in operation.

My present invention is directed to a flexible gear wheel comprising a hub or center portion and a gear-rim portion mounted for universal movement on the hub portion. In order to transmit torque between the hub and the rim portion, resilient elements are provided in the form of spring members, each having substantially the shape of an annulus with a small section removed to provide faces for engaging the hub and the gear-rim portion. A clearer understanding of the nature and objects of the invention may be had by reading the following detailed description, in conjunction with the accompanying drawing, in which:

Figure 1 is a view, partly in section and partly in end elevation, of a flexible gear wheel embodying my invention.

Fig. 2 is a view, partly in section and partly in side elevation, of the gear wheel shown in Fig. 1.

Fig. 3 is a view, in cross-section, taken along the line III—III of Fig. 1.

Fig. 4 is a view, in side elevation, of the hub portion of the gear wheel.

Fig. 5 is a view, in end elevation, of the hub portion.

Fig. 6 is a view, in end elevation, of one of the spring elements embodied in the flexible gear wheel.

Fig. 7 is a view, in cross-section, of the spring element taken along the line VII—VII in Fig. 6.

Fig. 8 is a view, in cross-section, of the side-plate members of the gear wheel taken along the line VIII—VIII of Fig. 9.

Fig. 9 is a view, in side elevation, of a portion of one of the side-plate members of Fig. 8.

Referring now to Fig. 1 in particular, the flexible gear wheel illustrated comprises a gear center or hub member 1 that is provided with spherically curved peripheral seating portions 2 that constitutes bearing surfaces upon which a composite gear rim member 3, having complementary spherically curved seating portions 4, is mounted. The gear center 1 is provided with a centrally disposed opening 5 for receiving a shaft (not shown) such as the axial shaft of a railway truck.

As shown in the drawing, the spherical periphery or seating portions 2 of the hub member 1 are disposed adjacent to the end faces 7 of the hub member. Between the spherical bearing surfaces 2 a groove or channel 8 is provided for a purpose to be hereinafter explained. From the bottom of the channel 8, a lug member 9, that is preferably an integral part of the hub 1, extends radially outward. As illustrated, the lug member 9 is provided with concave faces 11 to adapt it to be engaged by resilient members that will be described hereinafter. At uniformly spaced intervals about the periphery of the hub member 1, relatively short lugs or stop members 12 extend radially from the channel 8. An annular groove 14 is provided in the inner surface of the hub member 1 within the opening 5 to serve as a means for collecting lubricant that may be conveyed through a passageway 15 to the channel 8.

The gear-rim member 3 comprises a pair of co-operating side-plate members 21 and 22 that together constitute an annular retaining ring 23 of U-shape in cross section having inwardly extending flanges or side plates 24 that are provided with spherically-shaped bearing surfaces 4 for engaging the bearing surfaces 2 on the gear center 1. The side-plate members 21 and 22 each constitute a segment of the retaining ring 23 and are connected by dovetailed joints 26.

The retaining ring 23, when in position on the hub member 1, is disposed relative to the channel 8 to provide a chamber 27. A plurality of spring members 31 are disposed in side-by-side relation in the chamber 27 and serve to connect the hub portion 1 to the gear rim portion 3. The spring elements 31 are each of substantially the shape of an annulus having a small segment removed to provide faces 32 that are more fully described in the copending application Serial No. 251,041, filed February 1, 1928.

The faces 32 are adapted to engage the concave faces 11 of the lug member 9 and also to engage stop pins 33 that are disposed axially within the side-plate members 21 and 22 and spaced from each other a distance somewhat greater than the length of the lug member 9, as shown in Fig. 1. The spring elements 31 are adapted to bear against the inner periphery 28 of the retaining ring 23 at a point midway between their ends. In order that the spring elements 31 may be properly located within the chamber, spacing members 35 are provided in the side walls of the side plate 23. The chamber 27 further provides a storage space for lubricant that may be introduced into it through the passageway 15. The two segmental side plate members 21 and 22 are secured in their proper operating positions by means of a band or ring 38 that may be pressed or shrunk on their outer periphery to complete the gear rim 3. The outer periphery of the band 38 is provided with gear teeth 39 for engaging a cooperating pinion member (not shown).

In assembling my flexible gear wheel, the spring elements 31 are first placed in position upon the periphery of the hub member 1 with their ends 32 in engagement with the concave faces 11 of the lug member 9. The side-plate members 21 and 22 may then be fitted together over the spring elements 31 in such manner that the spherical bearing surfaces 4 will bear upon the spherical surfaces 2 of the hub member 1 and completely enclose the spring elements 31 within the chamber 27. The stop pins 33 are thereby brought into engagement with the ends 32 of the spring members 31. When the side-plate members are in their proper positions, the band 38 may be pressed into position on the periphery of the retaining ring 23 thereby rigidly securing the various elements of the gear wheel in their proper operating positions. The stop members 12 on the gear center 1 extend radially between the side plates 24 and serve to limit the lateral displacement of the rim member 3 relative to the hub member 1. In order that the tangential displacement of the rim member 3 relative to the hub 1 may not exceed a predetermined amount, a clearance space 41 that is provided between the lug 9 and the stop pins 33 is adapted to permit only the desired displacement.

In operation, when torque is transmitted from the gear rim 3 to the gear center 1, one of the stop pins 33 exerts a force upon one end 32 of the spring elements 31 thereby setting up compressive and bending stresses within it. The other end of the spring elements 31 engages one concave face 11 of the lug member 9 and exerts a force against it that tends to turn the gear center 1. The spring elements 31 are gradually deflected under the load imposed by the stop pin 33 in such manner that they tend to conform to the inner surface 28 of the gear rim member 3. When a load is imposed upon the gear wheel, thereby deflecting the spring elements 31, the process of conforming to the rim starts in their mid portions and progresses in both directions towards the ends. As the spring elements 31 progressively engage the inner surface 28 of the gear rim member 3, the total amount of spring material that is available for bending deflection becomes continuously reduced and, therefore, the deflection per unit increase in the torque is reduced as the load is increased. This action of the spring elements provides the rising load-deflection characteristic that was referred to hereinbefore.

It is evident from the foregoing explanation of my invention that a flexible gear wheel made in accordance therewith provides a compact and durable structure that is adapted to be used where space is limited and where conditions of misalinement and torsional vibrations between the driven and driving shafts are encountered.

Although I have described a specific embodiment of my invention, it will be obvious to those skilled in the art that various modifications may be made in the details of construction and in the arrangement and relation of the several cooperating parts without departing from the spirit and scope of my invention, as defined in the appended claims.

I claim as my invention:

1. A flexible gear wheel comprising a hub member having a spherical peripheral bearing surface, a rim member carried by the hub member, said rim member having an inner member bearing surface complementary to the bearing surface of the hub member, and a resilient member interposed between the hub member and the rim member for transmitting torque, said resilient member being in the shape of a segment of an annulus of different radius than the inner radius of the gear rim and adapted to be forced into contact with the gear rim when the rim member is displaced tangentially in either direction with respect to the hub member.

2. A gear element comprising a hub member having a spherically-curved periphery, a rim member movably mounted on said periphery and a spring element for connecting the hub member and rim member, said spring element being substantially the shape of an annulus with a segment removed to provide faces for alternately engaging the hub member and the rim member.

3. A flexible gear-wheel comprising a center portion having a spherically-curved periphery, a lug member on said center portion, a rim portion movably mounted on said center portion, stop members on said rim portion, and a spring element interposed between the center portion and the rim portion, said spring element comprising an annular spring member having a portion removed to provide faces for engaging both the lug member on the center portion and the stop members on the rim portion.

4. A flexible gear-wheel comprising a center portion having a spherically curved periphery, a lug member on said center portion, a rim portion movably mounted on said center portion, stop members on said rim portion, and a spring element interposed between the center portion and the rim portion, said spring element comprising an annular spring member having a portion removed to provide faces for engaging the lug member on the center portion and the stop members on the rim portion, and adapted to engage the rim at all times at a point diametrically opposite the stop members.

5. A flexible gear-wheel comprising a center portion having a spherical seating portion, a rim portion carried by the center portion, an annular spring element having an outer radius smaller than the inner radius of the rim portion and means on the center and rim portions for engaging the ends of the spring element, said spring element being adapted to engage the rim at all times at a point diametrically opposite the ends of the spring element and to conform to the inner diameter of the rim when deflected to provide an effective spring length inversely proportional to the tangential load on the gear-wheel.

6. A flexible gear-wheel comprising a center portion, a rim portion spherically seated on the center portion, and an annular spring element cooperatively engaging the center portion and rim portion, the spring element being of different radius than the inner radius of the gear rim and arranged to be forced into contact with the gear rim when deflected in either direction.

7. A flexible drive comprising a hub portion, a gear-rim portion mounted for universal movement on the hub portion, and a spring element interposed between said hub portion and rim portion, said spring element comprising an annular spring member having a portion removed to provide faces for engagement with said hub portion and the rim portion at all times and adapted to engage the rim portion at a point diametrically opposite the faces.

8. A gear element comprising a hub member having a spherically-curved periphery and a radially extending lug member, a rim member movably mounted on the hub member, a plurality of inwardly extending lugs on said rim member and a spring element having substantially the shape of an annulus having a segment removed to form faces for engaging both the lugs on the center and rim members.

9. A flexible gear-wheel comprising a center portion having a spherically-curved periphery, a radially extending lug member on the center portion, a rim portion movably mounted on the periphery of the center portion, said rim portion comprising two semi-circular side-plate members of U-shaped cross section disposed to be joined to constitute a circular retaining ring having a spherical inner surface for cooperating with the spherical periphery of the center portion and a band for encircling the side-plate members to retain them in position; and an arc shaped spring member disposed within the U-shaped side-plate members for transmitting torque between the center portion and the rim portion.

In testimony whereof, I have hereunto subscribed my name this 23rd day of July, 1927.

CLAUDE BETHEL.